United States Patent
Roberts

(10) Patent No.: US 7,845,647 B2
(45) Date of Patent: Dec. 7, 2010

(54) MULTI-LAYER GASKET OR SEAL MEMBER

(75) Inventor: Michael C. Roberts, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/292,245

(22) Filed: Nov. 14, 2008

(65) Prior Publication Data

US 2009/0146384 A1     Jun. 11, 2009

(30) Foreign Application Priority Data

Dec. 7, 2007    (GB)  ................... 0723931.2

(51) Int. Cl.
*F16L 17/06* (2006.01)
(52) U.S. Cl. .................. 277/608; 277/639; 277/650
(58) Field of Classification Search .............. 277/608, 277/628, 639, 641, 642, 650
See application file for complete search history.

(56) References Cited

U.S. PATENT DOCUMENTS 981,524 A * 1/1911 Bonner .................. 277/608

2,876,025 A     3/1959   Orloff et al.
4,626,002 A * 12/1986 Hagemeister et al. ......... 285/95

FOREIGN PATENT DOCUMENTS

| EP | 533161 A1 | * | 3/1993 |
| EP | 585783 A1 | * | 3/1994 |
| GB | 1021457 | | 3/1966 |
| JP | 53143854 A | * | 12/1978 |
| JP | 2003-322258 | | 11/2003 |

* cited by examiner

*Primary Examiner*—Shane Bomar
*Assistant Examiner*—Gilbert Y Lee
(74) *Attorney, Agent, or Firm*—Oliff & Berridge, PLC

(57) ABSTRACT

A gasket or seal member constructed of elastomeric material has at least one slot extending lengthwise of the member and across its thickness at an oblique angle to the sealing faces. There may be a plurality of slots spaced apart across the width of the member. In a preferred form of the invention multiple, parallel slots are formed at an oblique angle to the seal faces of the member forming branchiate-like layers of gasket material, in which each of the layers partially overlays at least one other layer.

7 Claims, 2 Drawing Sheets

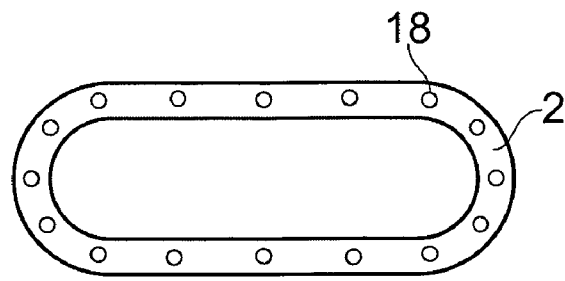
FIG. 1
RELATED ART
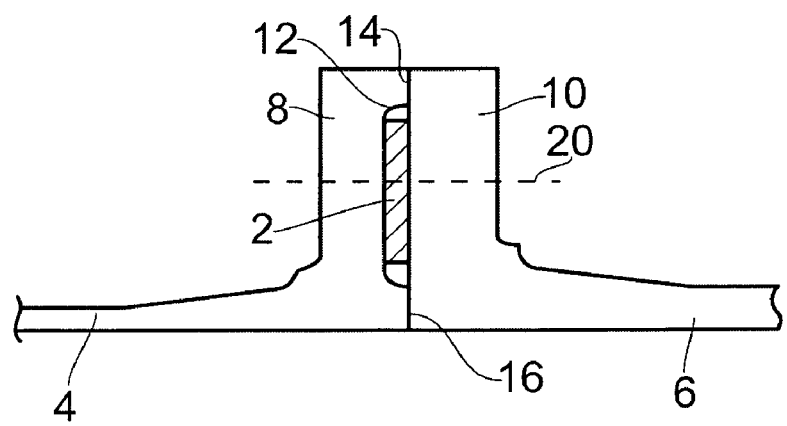
FIG. 2
RELATED ART
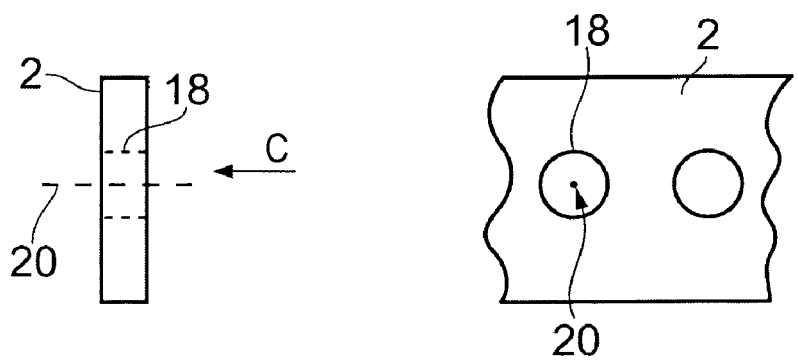
FIG. 3
RELATED ART
VIEW ON C
FIG. 4
RELATED ART

MULTI-LAYER GASKET OR SEAL MEMBER

BACKGROUND

The invention concerns a multi-layer gasket or seal member.

In particular the invention relates to a gasket or seal member for use in a flanged joint subject to a pressure differential. For example the kind of joint found between gas turbine engine casing sections. However, the invention will find wider use to seal flanged joints between duct and casing sections generally, or anywhere else where plain face-to-face seals are presently used.

Flanged joints are commonly used to join casing and duct sections together, as well as pipe lengths. Where a fluid tight seal is required some form of gasket or seal member is interposed between the flanges. The most common type of seal is a plain face-to-face seal made of resilient or elastic material, capable of withstanding sustained contact with the contained fluid and the fluid pressure. Flanges are effective seats for face-to-face seals providing the flange faces are machined substantially flat, and remain so in use. However, such joints are liable to suffer leakage problems if the flanges are not stiff enough to avoid significant distortion effects at the joint interface arising from relative flexing of the components on either side of the joint.

SUMMARY

The present invention is intended to overcome the above-discussed disadvantages, among others. According to an embodiment the present invention there is provided a gasket or seal comprising a member of gasket material having at least one slot extending lengthwise of the gasket and across its thickness at an oblique angle to the sealing faces to form, in a branchiate-like manner, multiple layers of gasket material such that each layer partially overlays at least one other layer.

Preferably each lengthwise extending slot is discontinuous in the direction of the length of the gasket member, and across the width of the gasket member there is formed a plurality of slots at intervals spaced apart one from another.

In a preferred form of a gasket or seal according to the invention the plurality of slots are spaced apart across the width of the gasket member and the oblique angle at which the slots are formed produces in the gasket member a plurality of partially overlapping layers of gasket material.

The invention and how it may be carried into practice will now be described in greater detail with reference to the accompanying drawings.

BRIEF DESCRIPTION OF THE DRAWINGS

FIG. 1 shows a plan view of a conventional seal or gasket;

FIG. 2 shows a section through a flanged joint including a section through a gasket, which may be of the kind illustrated in FIG. 1;

FIGS. 3 and 4 show detail views in section and plan of a prior art gasket or seal member;

DETAILED DESCRIPTION

Figures 5, 6:
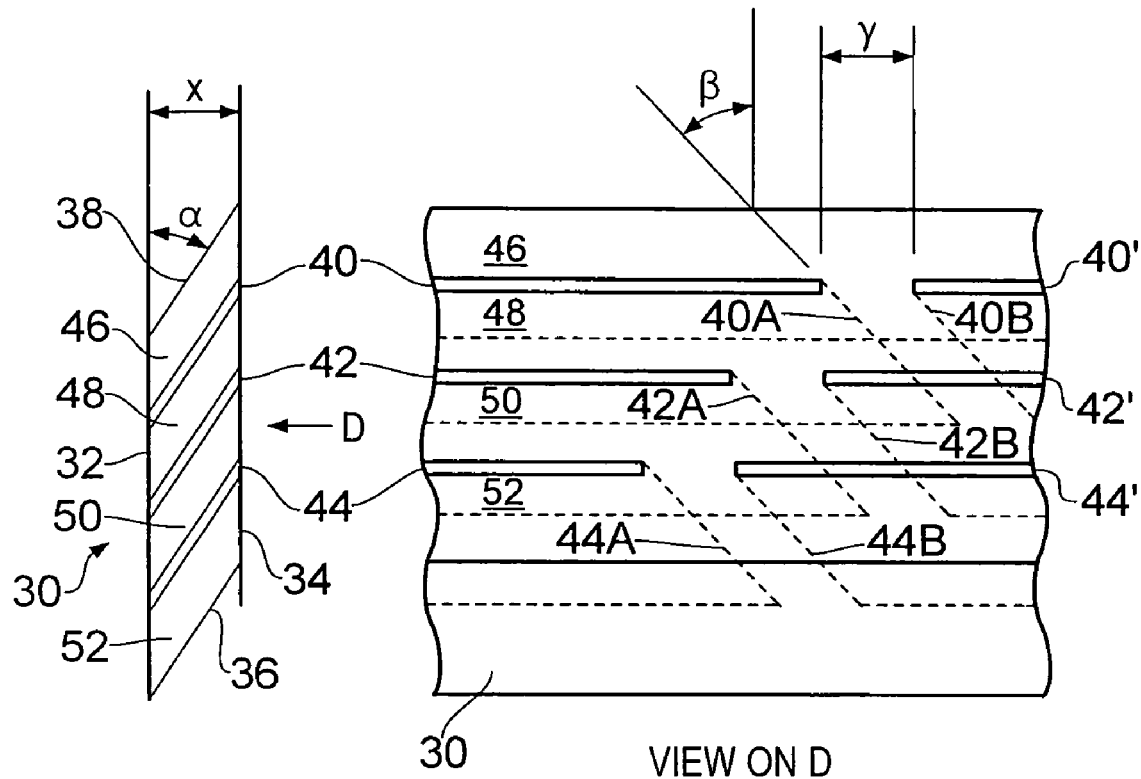
FIG. 5 shows a view corresponding to the view of FIG. 3 of a section through a gasket or seal according to the invention.
FIG. 6 shows a portion of a plan view of a gasket or seal according to the invention.

Referring now to the drawings, FIGS. 1, 2, 3 and 4 show a conventional, known seal member 2 for use as a flanged joint gasket between two duct sections 4, 6 (FIG. 2). The duct sections 4,6 have end flanges 8, 10 respectively and when assembled the seal member 2 is sandwiched between the flanges 8,10. As shown in FIG. 2, in the illustrated case the seal member 2 is housed in a groove or recess 12 let into the joint face 14 of the flange 8 on duct section 4. The joint face 16 of the opposite flange 10 is finished flat. When in place in the recess 12 the exposed face of the seal member 2 stands slightly proud of the flange face 14 so that when the flanges 8,10 are clamped one against the other the seal is compressed into groove 12 by the opposing flange face 16 of duct section 6.

Bolt holes 18 are spaced apart around the flange joints 8,10 to receive a multiplicity of clamp bolts; the view of the gasket 2 in FIG. 1 shows a total of sixteen bolt holes 18, by means of which the flanges 8, 10 are fastened together. In the views of FIGS. 2, 3 and 4 the position of a bolt hole 18 is indicated by a centre line 20 midway across the breadth of the gasket 2. The holes 18 in the gasket align with corresponding apertures 18 in the duct flanges 8, 10.

Typically gasket 2 comprises a single, monolithic body of elastomeric material. The thickness of the gasket normally is chosen to suit the application and properties of the material. Thus, if the flanges are finished as plain faces the gasket 2 will normally consist of a thin, single sheet-like member of rectangular cross section as illustrated in FIG. 3. However, poor surface textures, for example milling cusps or witness marks left by milling operations on the faces of the joint flanges 8, 10 may give rise to leakage problems. Also flange movement due to relative flexing of the casing or duct sections 4, 6 can cause sufficient distortion to result in leakage across a face of the gasket 2.

The seal member or gasket of the invention illustrated in FIGS. 5 and 6 is intended to provide a solution to these problems. The views of FIGS. 5 and 6 correspond to those of FIGS. 3 and 4 and show cross-sections and side views respectively. In the example used to illustrate the invention the gasket shown in FIG. 1 has a particular shape, two long, parallel sides joined by semi-circular ends. However, it will be understood that the invention is not restricted to gaskets or seal members of this, or any other particular shape, and the following description with appropriate changes where necessary will be find general application. The drawings are not to scale.

In the example described above the gasket illustrated in FIG. 1 may be substituted by a gasket having the same profile in plan view but constructed as illustrated in the cross-section and detailed views of FIGS. 5 and 6 in accordance with the invention. The gasket member 30 according to the invention comprises a seal or gasket member made of an elastomeric material, depending on circumstances suitable alternative materials include plastic material, fibre or metal. As a replacement for the prior art gasket of FIG. 1 a gasket in accordance with the present invention also has a profile in plan view of a closed figure consisting of two parallel sides joined by semi-circles at either end. In cross-section, however, as shown in FIG. 5 it has the shape of a non-rectangular parallelogram. The gasket has a thickness "x" between opposite faces 32, 34, the remaining edges of the parallelogram, that is faces 36, 38 are formed parallel to each other and at an oblique angle "α" with respect to the parallel faces 32, 34.

In accordance with the invention the seal or gasket 30, or at least as much of it as is practicable, has a branchiate structure. That is much of the body of the seal or gasket member has a structure akin to branchiae, the breathing organs or gills of a fish. The branchiate portions of the seal member 30 comprise at least one, and preferable a plurality of, flexible membranes or strips formed by a plurality of narrow slots. The present example has three slots 40, 42, and 44 which run parallel to the long edges or end faces 36, 38 of the seal member, thus producing four flexible membrane strips 46, 48, 50 and 52. The seal member may contain a greater or lesser number of slots and membrane strips. These slots 40, 42, 44 extend through the thickness of the gasket member 30 at oblique angle "α" with respect to the surfaces 32, 34, parallel to the faces 36, 38 and to each other. The slots 40, 42, 44 extend part way around the gasket 30, thus part of the gasket lies between the ends of the slots forming a land therebetween. Referring to FIG. 6 the ends of the slots, denoted by suffixes "A" and "B", are spaced apart by a short distance "y". Preferably, the ends of the slots are formed at an oblique angle "β" with respect to the longitudinal direction of the slot, see 40A and 40B in FIG. 6. Thus, depending upon the angles α, β and the dimensions x, y the portions of gasket overhang or overlay one another to greater or lesser amounts. A large overhang has the effect of reducing the stiffness of the gasket member 30 in the direction across the member compared with the stiffness of a solid seal member 2 of the prior art kind shown in FIGS. 2, 3 and 4.

The narrow slots separate the gasket member 30 into a plurality of overlaying segments each of which is able to rotate slightly under load independently of each other. Thus, by choosing the dimensions, the stiffness of the seal member 30 can be selected to create a flexible member that is able to seal against a surface of poor surface texture, such as against flange faces 14, 16 of FIG. 2 produced by milling. In addition each segment is also able to translate slightly under load to seal against a pair of such flange faces. In operation the independent small rotations of the segments counter contrary local variations in mating flanges and the translations counter sympathetic local variations and the narrow slots each function approximately as a plenum chamber. The resulting effect is to reduce any flow across the seal faces by introducing intermediate pressure pockets in each slot. Furthermore the risk of leakage is greatly reduced because to establish a leakage flow all independent segments would have to be defective simultaneously. The slots improve sealing effectiveness by increasing flexibility in the segment contact and the number of potential seal barriers.

It will become evident upon considering the detail shown in FIG. 6 that the slots 40, 42, 44 could not continue around the seal member 30 without dividing it into a number of separate parts. Therefore, in order to maintain structural integrity of the seal member 30, each of the narrow slots is discontinuous at regular intervals along its length, the slot lengths being separated by individual lands of width "y". Each land thus formed potentially increases stiffness that could increase the risk of a leak. This problem is solved: firstly by staggering the lands between neighbouring slots 40 & 40', 42 & 42', 44 & 44', and secondly by forming the ends of the slots 40A & 40B, 42A & 42B, 44A & 44B at compound angles. The lands forming the slot discontinuities are shown "in-line", ie they are staggered in the same direction and relatively close together but, alternatively, the lands may be staggered in a "zigzag" fashion and/or more widely spaced apart. Discontinuities increase the probability of a leak occurring but in compensation the number of slots may be increased thus reducing the overall possibility of a leak across the whole width of the gasket.

Figure 7:
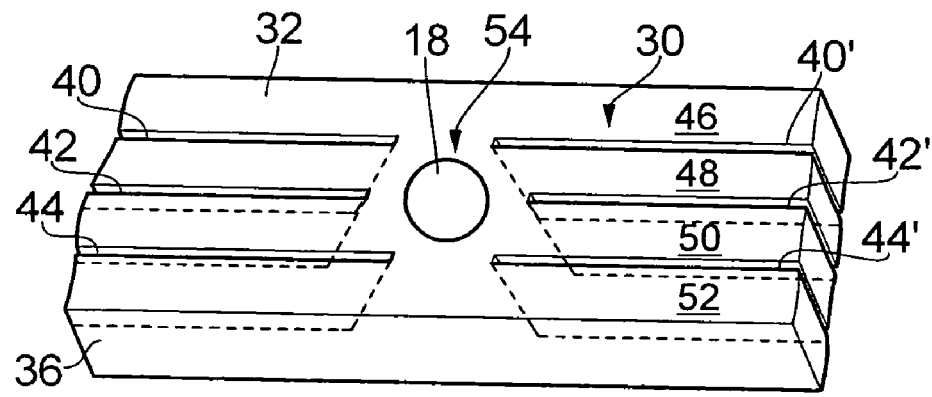
FIG. 7 shows a further portion in the vicinity of a bolt hole in the gasket or seal of FIG. 6.

Boltholes introduce potential design complexity. The lands separating two or more slots should not be given to the aperture of a bolthole as to do so would create free ends of gasket sections. To avoid free ends that may be assembled incorrectly it is preferred that a bolthole aperture is surrounded by continuous seal land. FIG. 7 shows an example of how the seal member 30 may be designed to avoid free ends. The seal member 30 is pierced by a bolthole aperture 18 approximately at mid-breadth. The slots 40, 42, 44 are terminated a short distance from the circumference of aperture 18, thus leaving an uninterrupted land 54 surrounding the aperture 18. In order to retain as much as possible of the benefit of the improvement due to the invention the width of the land 54 is kept as short as practicable. Furthermore, it is inadvisable to design a joint so that the load carried by a bolt passes directly through a seal or gasket member as this could cause low cycle fatigue in the bolt. The preferred solution is substantially to relieve the clamp load immediately adjacent to a bolthole by one of two methods. First, the groove 12 into which seal 2 is fitted is formed around a bolthole to leave a boss concentric with the bolthole itself. Since such a groove is formed by removing material from the duct flange 8 then the top of the boss remains level with the flange face 14. Alternatively, the machined part of groove 12 includes the sites of the boltholes 18, that is a boss is not formed, and a washer of thickness equal to the depth of the groove is placed in the groove around a clamp bolt. In both instances, because the thickness of seal member 2 is slightly greater than the depth of groove 12, when the flanges 8, 10 are clamped together the seal member 2 is only lightly compressed all over and the greater amount of the clamp force is transmitted through either the bosses or the washers and contacting flange faces in the vicinity of the boltholes 18.

What is claimed is:

1. A gasket comprising a member of gasket material having sealing faces extending lengthwise and spaced apart by a thickness, the member having at least one discontinuous slot extending through the thickness of the member and lengthwise of the member at an oblique angle to the sealing faces to form multiple, branchiate-like layers of gasket material such that each layer partially overlays at least one other layer, the at least one discontinuous slot being discontinuous in a direction of a length of the gasket member.

2. A gasket or seal as claimed in claim 1 wherein across the width of the gasket member there is formed a plurality of slots at intervals spaced apart one from another.

3. A gasket or seal as claimed in claim 1 wherein the oblique angle is approximately forty-five degrees.

4. A gasket or seal as claimed in claim 3 wherein the slots producing the overlapping layers are arranged in groups and the ends of the slots in each group are staggered.

5. A gasket or seal as claimed in claim 4 wherein the ends of the slots of adjacent groups of slots are spaced apart a short distance.

6. A gasket or seal as claimed in claim 5 wherein the ends of the slots of adjacent groups of slots are spaced apart a short distance such that layers of one group overlap layers of an adjacent group.

7. A gasket or seal as claimed in claim 1 wherein the gasket material comprises an elastomeric material.

* * * * *